W. W. MILLER.
PROTECTING DEVICE.
APPLICATION FILED NOV. 8, 1920.

1,413,925.

Patented Apr. 25, 1922.

Waldo W. Miller, INVENTOR.

BY Watson E. Coleman ATTORNEY.

UNITED STATES PATENT OFFICE.

WALDO W. MILLER, OF ANGOLA, INDIANA.

PROTECTING DEVICE.

1,413,925.  Specification of Letters Patent.  Patented Apr. 25, 1922.

Application filed November 8, 1920. Serial No. 422,670.

*To all whom it may concern:*

Be it known that I, WALDO W. MILLER, a citizen of the United States, residing at Angola, in the county of Steuben and State of Indiana, have invented certain new and useful Improvements in Protecting Devices, of which the following is a specification, reference being had to the accompanying drawings.

This invention relates to certain improvements in protecting devices for windshields of automobiles and similar vehicles, and it is an object of the invention to provide a novel and improved device of this general character which operates effectively to protect the shield from rain, snow or other extraneous matter.

Another object of the invention is to provide a novel and improved device of this general character adapted to be supported by the forward portion or front bow of a vehicle top and in a manner whereby the same may be adjusted in a perpendicular direction to assume a position to best meet the requirements of practice.

An additional object of the invention is to provide a novel and improved device of this general character adapted to be operatively engaged with the forward portion or front bow of a vehicle top and wherein means is provided to prevent rain, snow or the like passing over the protector and under the vehicle top.

The invention consists in the details of construction and in the combination and arrangement of the several parts of my protecting devices whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein.

Figure 1:
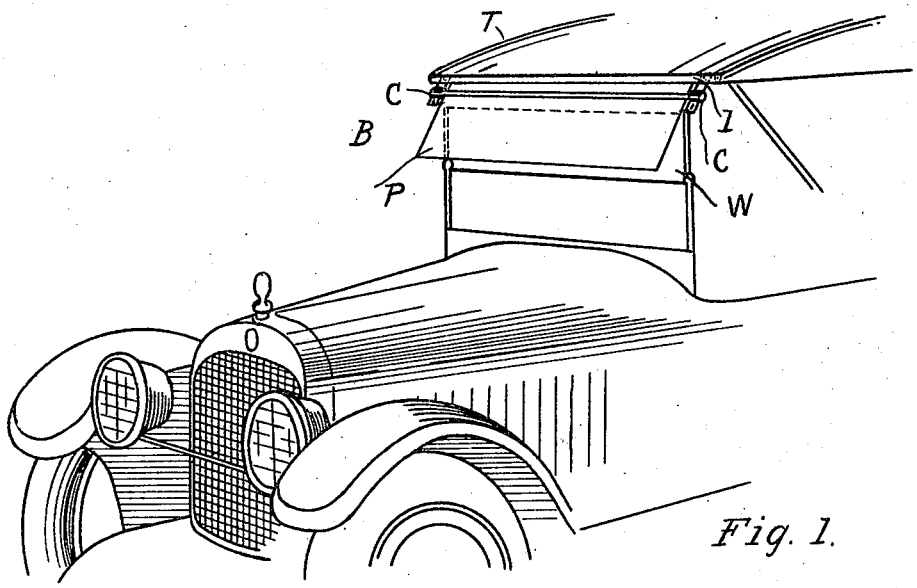
Figure 1 is a fragmentary view in perspective of an automobile having applied thereto a protecting device constructed in accordance with an embodiment of my invention.
Figure 2:
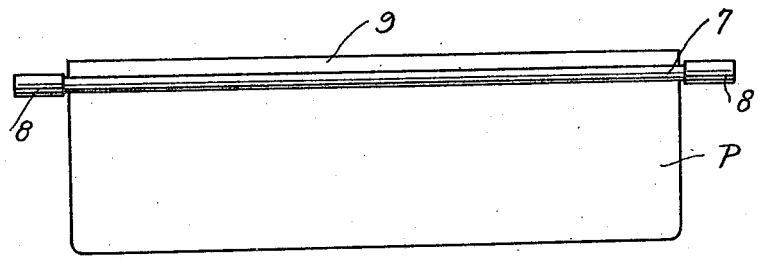
Figure 2 is an elevational view of the panel and the parts concomitant thereto.
Figure 3:
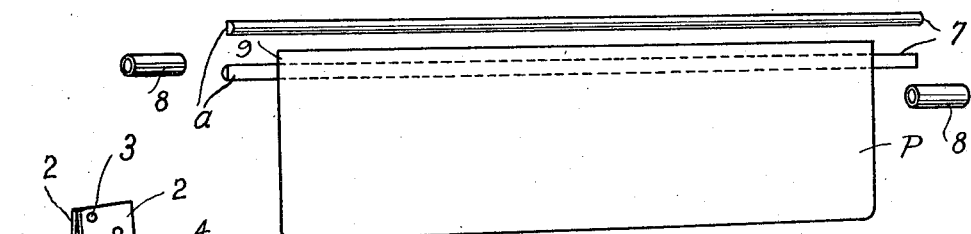
Figure 3 is a view similar to Figure 2 with certain of the parts in separated relation.
Figure 4:
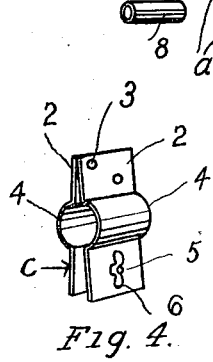
Figure 4 is a view in perspective of one of the clamping members.

As disclosed in the accompanying drawings, B denotes the front portion of an automobile or kindred vehicle body including a top T of a conventional type and which top embodies a front bow 1. Secured to the forward or intermediate portion of the bow 1 adjacent the opposite sides of the top T are the clamping brackets C.

Each of the clamping brackets C comprises a pair of superimposed plates 2 having adjacent ends secured to the bow 1 by the bolts 3 or the like. The central portions of the plates 2 are provided with the oppositely directed outbows 4 providing inwardly facing jaws, each of said outbows being substantially semicircular in form.

Disposed through the opposite or outer end portions of the plates 2 is a bolt 5 having engaged with the free end portion thereof a wing nut 6 or the like whereby the plates 2 of the clamping brackets C may be caused to grip effectually its work.

P denotes a panel or flat opaque body preferably oblong in form and of a length substantially coextensive with the width of the windshield W. The panel or body P is also of desired width so that it can be employed with advantage to partially overlie the upper portion of the windshield W to effect a guard or protector against rain, snow or other extraneous matter, so that the vision of the driver of the vehicle will not be obscured.

The panel or body P also effectually protects the eyes of the driver against strong natural or artificial lights and is of particular advantage when driving toward the sun as the panel serves to prevent glare of the windshield and thereby permits driving of the vehicle without straining or tiring the eyes. This is also true when driving through a lighted city or other locality artificially illuminated as the panel or body P substantially eliminates the reflection of the lights on the windshield.

The upper or inner longitudinal marginal portion of the panel or body P is engaged between the opposed flat faces $a$ of the elongated rods 7, said rods being coextensive in length and each being preferably semicircular in cross section. In mounting the panel or body P, the upper or inner longitudinal marginal portion is suitably secured to the flat face *a* of the lower rod 7 and after which the second rod 7 is imposed upon the first rod and the flat face *a* of said second rod suitably engaged with the upper or inner marginal portion of the panel or body P.

The rods 7 are of a length to extend beyond the ends of the panel or body P and mounted upon each extended portion of said rods is a ferrule or sleeve 8 preferably of metal. The applied ferrules or sleeves 8 are engaged between the jaws 4 of the clamping brackets C and the panel or body P is maintained in desired adjustment by tightening the plates 2 through the medium of the coacting bolts 5 and nuts 6. When desired, the panel or body P may be swung upwardly into an inoperative position overlying the top T.

The upper or connected longitudinal marginal portion of the panel or body P has extending outwardly therefrom a flexible strip 9 which is adapted to bridge the space between the applied rods 7 and the adjacent or front end of the top T to provide a guard or shield to prevent rain, snow or other material from passing over the top of the panel or body P and under the top T.

From the foregoing description it is thought to be obvious that a protecting device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

In combination with a vehicle including a top and a windshield, a protector member comprising a panel, a semi-cylindrical rod attached to one side of the panel, a second semi-cylindrical rod mounted on the opposite side of the panel, both of said semi-cylindrical rods extending beyond the ends of the panel, sleeves removably secured over the ends of the cylindrical rods, and clamps secured to the top and embracing the sleeves whereby the panel may be folded against the windshield or over on the top.

In testimony whereof I hereunto affix my signature.

WALDO W. MILLER.